June 24, 1958    H. S. NEIMAN, JR    2,839,830
EATING UTENSIL
Filed Feb. 7, 1955

INVENTOR.
HOWARD S. NEIMAN, Jr.
BY
ATTORNEYS

United States Patent Office 2,839,830
Patented June 24, 1958

2,839,830
EATING UTENSIL

Howard S. Neiman, Jr., Ocean City, N. J., assignor to George P. Pilling & Son Company, Philadelphia, Pa., a corporation of Pennsylvania Application February 7, 1955, Serial No. 486,592

3 Claims. (Cl. 30—147)

This invention relates to an eating utensil designed particularly for the use of persons having only one hand capable of use, such as amputees or paralytics.

It is the object of the present invention to provide an eating utensil which may be effectively manipulated through the use of only one hand and which serves as a fork, a spoon, and as a cutting implement. Cutting is particularly difficult for a person having the use of only one hand in view of the inability to hold food, such as meat, during the cutting operation. There is also considerable difficulty in positioning food, such as meat, for proper cutting. In accordance with the present invention, a scissors-like implement is provided which is particularly designed for the effective positioning and cutting of meat, or the like, and will also serve, without requiring the necessity for laying it down, as a spoon and as a fork, being readily manipulated to different positions by the use of the hand. The broad object of the invention and subsidiary objects relating particularly to details of construction will be apparent from the following description, read in conjunction with the accompanying drawing, in which:

Figure 1:
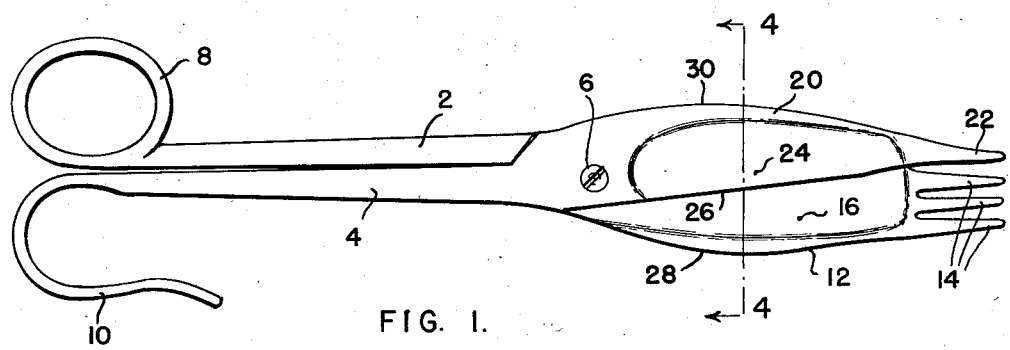
Figure 1 is a plan view of the implement in its preferred form showing its cutting portions closed to put it in condition for use as a spoon or fork.

The implement may be generally viewed as a modified scissors comprising the lever elements 2 and 4 secured in the fashion of ordinary scissors by a screw 6. The implement may be provided in right and left-hand forms, there being illustrated in the drawing a right-hand implement for use by a person having the right hand available, a left-hand implement being the mirror image of this right-hand implement. In the implement shown, the lever 2 is provided with a loop 8 for the reception of the index finger, while other lever 4 is provided with a hook 10 for the reception of the thumb. Hook 10 has been found preferable to a loop since when the implement is shifted from cutting operation to a position for utilization as either a fork or spoon, the thumb may be moved forwardly out of the hook 10, whereas if a loop were provided an inconvenient withdrawal motion of the thumb is required. However, an elongated loop leaving a space for removal of the thumb by angular motion may be provided, if desired, in place of the hook.

Figure 3:
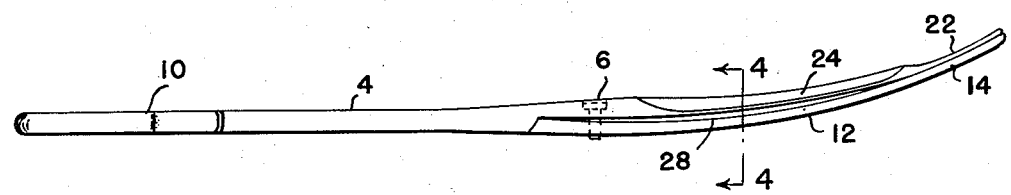
Figure 3 is a side elevation of the implement.
Figure 2:
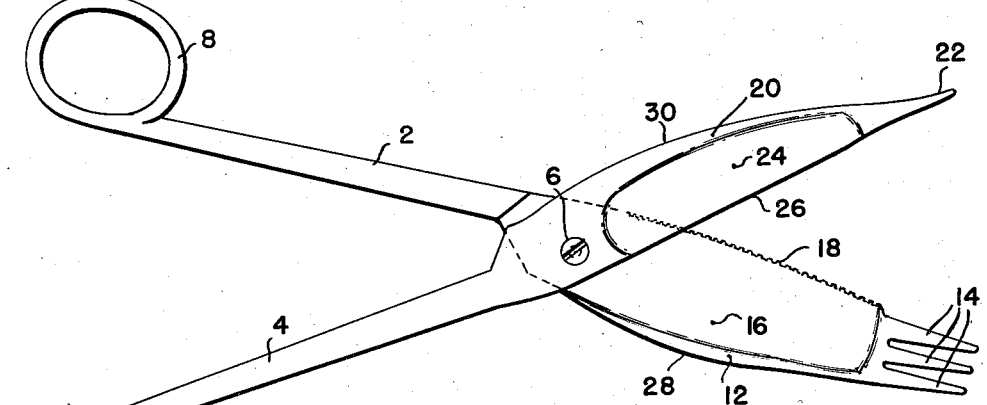
Figure 2 is a similar view but showing the implement open.

At its forward end, the lever 2 is in the form of a blade 12 which has a plurality of tines 14 having the conventional form of the tines of a dinner fork, i. e. being bluntly sharpened so as readily to penetrate food but not so sharp as to be injurious if accidentally brought in contact with the mouth or tongue. The upper surface of the blade 12, as viewed in Figure 3, is dished, i. e., has a concave surface, as indicated at 16 to form effectively one side of a spoon. The inner edge of the blade 12 is bevelled in the conventional fashion of a shearing or scissors blade but is additionally provided with serrations 18 forming minute teeth and serving to grip a piece of food to be cut to prevent its slipping forwardly from between the cutting blades. The serrations are desirably fine and are considerably exaggerated for clarity of showing in Figure 2.

Figure 4:
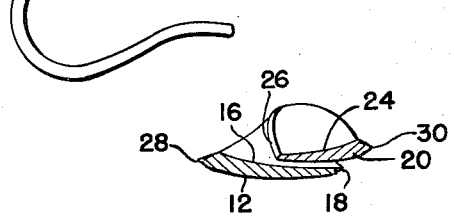
Figure 4 is a section taken on the plane indicated at 4—4 in Figures 1 and 3.

The lever 4 carries upper blade 20 which is provided with a single tine 22 having the same characteristics as the tines 14 and effectively provides, when the implement is closed as in Figure 1, a further tine of a fork. The blade 20 is dished, i. e., has a concave surface, as indicated at 24 to provide the other side of the spoon-shaped configuration which is provided when the implement is closed. A bevelled shearing or scissors cutting edge is provided on blade 20 to 26. As is conventional with scissors, the parts are so sprung under the action of the holding screw 6 that, as the blades move from open to closed position, the two edges 18 and 26 have relative sliding and cutting action in contact with each other which results in a final closed condition such as illustrated in Figure 4 with the intermediate portions of the blades slightly sprung apart. While the spoon thus provided would not be suitable for holding liquid, it is very well adapted for holding such foods as have a mushy consistency.

The outer edges 28 and 30 of the blades are desirably bluntly sharp so as to be adapted for the cutting of such materials as lettuce, tomatoes, or the like, while, nevertheless, not being so sharp as to possibly damage the mouth accidentally.

The outer edge of the tine 22 and the edge 30 merge smoothly as do also the inner edge of the tine 22 and the cutting edge 26, both as illustrated.

In the use of the implement for cutting, the tine 22 may be used as a wedge to slip under and lift a piece of meat, or the like, and, if desired, manipulate it into position for cutting. The cutting edge 26 is smooth so that the tine 22 and the adjacent portions of its blade may be readily slid under the food. Cutting may then be accomplished in a scissors-like fashion and the serrations 18 will prevent the food from slipping outwardly as the blades are closed. Following closing, the position of the implement may be shifted as by removal of the thumb from the loop 10 and the implement then used in its closed condition as either a fork or spoon to convey the food to the mouth. Cutting of suitably readily cut foods may be accomplished by the edge 30 or, if more convenient, the edge 28 may be used for cutting.

It has been found that the implement designed as described may be readily manipulated for general eating merely by shifting to different positions without any necessity for placing it on the plate for regrasping.

It will be evident that various changes in details of construction may be made without departing from the scope of the invention as defined in the following claims.

What is claimed is:

1. An eating utensil comprising a pair of levers pivoted to each other and each comprising a handle portion and a blade portion, the handle portion of one of said levers being provided with a finger receiving loop while the handle portion of the other lever is provided with a thumb receiving elongated hook, said blade portions being provided with cooperating shearing edges and said blade portions having concave surfaces providing cooperatively when closed a spoon-shaped configuration, the blade portion of one of said levers being provided with a plurality of tines and the blade portion of the other of said levers being provided with a single tine merging smoothly with the outer edge and with the shearing edge of its blade portion.

2. An eating utensil as set forth in claim 1 in which the blade portion provided with a plurality of tines has a serrated shearing edge and the blade portion provided with a single tine has a smooth shearing edge.

3. An eating utensil as set forth in claim 1 in which the lever with the handle having the elongated hook has the blade having a single tine.

References Cited in the file of this patent

UNITED STATES PATENTS

| | | |
|---|---|---|
| 198,442 | Withington | Dec. 18, 1877 |
| 1,230,766 | Ovens | June 19, 1917 |
| 1,351,045 | Larson | Aug. 31, 1920 |
| 2,313,651 | Lutman | Mar. 9, 1943 |

FOREIGN PATENTS

| | | |
|---|---|---|
| 614,276 | Germany | June 5, 1935 |